United States Patent [19]
Peh et al.

[11] Patent Number: 5,796,645
[45] Date of Patent: Aug. 18, 1998

[54] MULTIPLY ACCUMULATE COMPUTATION UNIT

[75] Inventors: Kheng Boon Peh; Eng Han Lee, both of Singapore, Singapore

[73] Assignee: Tritech Microelectronics International Ltd., Singapore, Singapore

[21] Appl. No.: 697,700

[22] Filed: Aug. 27, 1996

[51] Int. Cl.$^6$ ...................................................... G06F 7/00
[52] U.S. Cl. ...................................................... 364/750.5
[58] Field of Search .................. 364/750.5, 736.02, 364/748.07, 760.01, 760.02, 760.03, 760.04, 760.05

[56] References Cited

U.S. PATENT DOCUMENTS

| | | | |
|---|---|---|---|
| 4,575,812 | 3/1986 | Kloker et al. | 364/760 |
| 5,497,342 | 3/1996 | Mou et al. | 364/786 |
| 5,500,812 | 3/1996 | Saishi et al. | 364/745 |

OTHER PUBLICATIONS

C.S. Wallace, "A Suggestion For A Fast Multiplier" IEEE Transaction on Computers vol. 13, pp. 14–17, Feb. 1964.
A.D. Booth, "A Signed Binary Multiplication Technique" Quarterly Journal of Mechanical and Applied Mathematics, vol. 4, p. 42, 1951, pp. 236–240.

*Primary Examiner*—Reba I. Elmore
*Assistant Examiner*—Robert J. Dolan
*Attorney, Agent, or Firm*—George O. Saile; Stephen B. Ackerman; Bill Knowles

[57] ABSTRACT

A multiply/accumulate computation circuit is provided. The circuit will perform the multiplication of a first binary number that is a multiplicand and a second binary number that is a multiplier to produce a product. The product can be added or subtracted from a previous result. The product may be negated. The product may be multiplied by a factor of two. Or the product that is multiplied by the factor of two may be added or subtracted from the previous result. The multiplication is accomplished in a modified Radix 4 Booth's encoding and translation circuit to produce a set of partial products that are combined in a n operand adder to form a final result.

20 Claims, 8 Drawing Sheets

FIG. 3c signed-extended Operand A
signed-extended Operand B
sign-extended partial product 1
sign-extended partial product 2
sign-extended partial product 3
sign-extended partial product 4
sign-extended partial product 5
sign-extended partial product 6
sign-extended partial product 7
sign-extended partial product 8
sign-extended partial product 9
2's complement component pp10

RESULT R

MULTIPLY ACCUMULATE COMPUTATION UNIT

BACKGROUND OF THE INVENTION

1. Field of the Invention

This invention relates to digital computational units that perform series of multiplies, additions, and subtractions on groups of input operands. These units provide high speed and efficiency necessary for computationally intensive applications such as digital signal processing.

2. Description of Related Art

The mathematics of many applications within computationally intensive applications require operations such as finding the determinant of a matrix. The process of finding the determinant of a matrix involves repetitive multiplication of two operands and either adding or subtracting the products from the previous results to accumulate the results of the multiplication.

Figure 1:
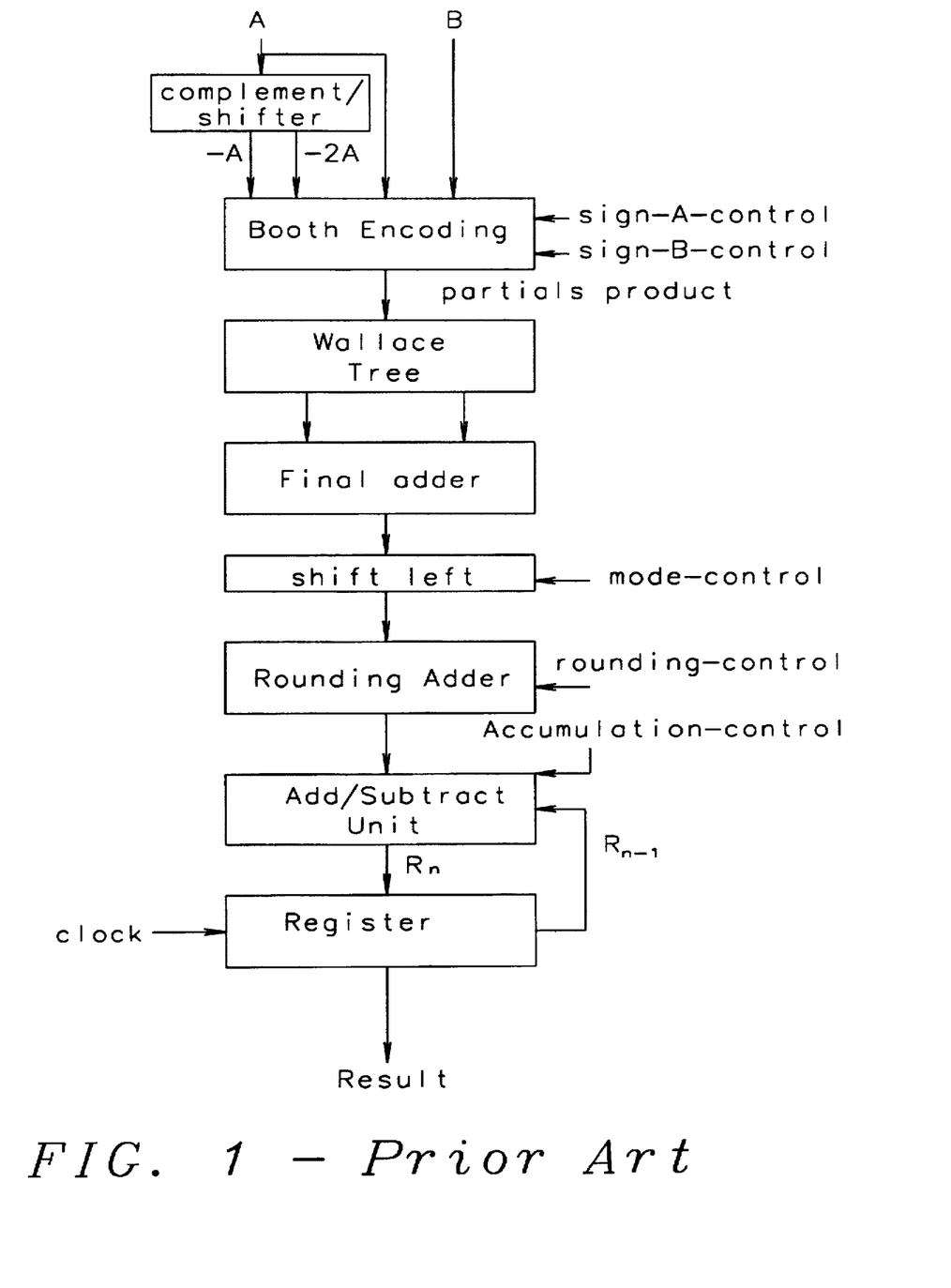
FIG. 1 is block diagram of the structure of a Multiplier/Accumulator Computation Unit of prior art.

FIG. 1 shows a typical structure of a multiply/accumulate computational (MAC) unit of prior art. The operands A and B, which are two's complement binary numbers, form the multiplicand A and the multiplier B. The operands A and B is the input to the Complementer/Shifter which forms the suboperands −A and −2A, where −A is the complement of the operand A and −2A is the complement of the operand A shifted left one binary digit. The operands A and B and the suboperands −A and −2A are input to the Booth encoder to form the partial products. The control of the of the placing of the complements of the operands A and B is accomplished by the signal lines sign__A__control and sign__B__control. The original algorithm of the Booth encoder was described by A D. Booth, in "A Signed Binary Multiplication Technique," Quarterly Journal of Mechanical and Applied Mathematics, Vol 4, Pt 2, 1951, pp 236–240.

A Wallace Tree that will sum the partial product. The Wallace Tree Technique for the summation of the partial products is well known in the art and was first described by C. S. Wallace, "A Suggestion For A Fast Multiplier, "IEEE Transaction on Computers," Vol. 13, pp14–17, February, 1964. The product of the multiplicand A and the multiplier B is formed when the results of the Wallace tree are placed in the Final Adder. If the result of the product is to be multiplied by a factor of two, the product is shifted left one binary digit in the shifted left unit. The control of the shifting or direct passing of the product is controlled by the signal Mode__Control.

If the result of the product is to be rounded, the product is placed in the rounding adder and the control of the rounding adder is determined by the signal Rounding__Control. The binary number representing the number of digits to be rounded is added to the product. For instance if the product was a 16 bit binary number that was to be rounded to the 8th digit then the operation will be

```
XXXXXXXXXXXXXXXX
            +1
————————————————
XXXXXXXX1XXXXXXX
```

The results of the Rounding Adder is transferred to the Add/Subtract Unit, where the results maybe added or subtracted from the previous results Rn−1 and the new results Rn are stored in the Results Register at every active edge of the clock. The accumulation of the results of the rounding adder and the previous results Rn−1 is determined by the Accumulation__control.

The application of the MAC Unit in iterative processes such as matrix arithmetic make the performance of MAC unit critical to the performance of the computation system.

The MAC Unit as described will perform the following functions:

$R=AXB$ $R=Rn-1+AXB$ $R=Rn-1-AXB$

U.S. Pat. No. 5,497,342 (Mou, et al.) teaches a multiplier circuit having a summation of the partial products in a plurality of interconnecting carry-save adders configures as "over-turned stairs." This circuit is for use in high speed iterative multipliers.

U.S. Pat. No. 4,575,812 (Kloker, et al.) illustrates a multiplier/accumulator circuit that will multiply two numbers together and provide a result or will multiply two numbers together and accumulate the resulting product with a third number.

U.S. Pat. No. 5,500,812 (Saishi, et al.) details a multiplier circuit that allows the rounding of the product of a multiplicand and multiplier based on the sign of said multiplicand and multiplier.

SUMMARY OF THE INVENTION

An object of this invention is the reduction in the complexity of the Multiplication/Accumulation Computation circuitry. A further object of this invention is the improvement in performance of the Multiply/Accumulation Computation Circuitry while including the ability to multiply the product results by a factor of two and to provide a rounding function to the final results.

To accomplish these and other objects, the Multiplier/Accumulator Computation Circuit has a modified Booth multiplier. The multiplicand and the multiplier may each be an unsigned binary number or a two's complement binary number. The modified Booth multiplier has the inputs of a multiplicand, a multiplier, a set of results from the previous operation, and a digital control code. The modified Booth multiplier performs a modified Radix 4 Booth's algorithm multiplication of the multiplicand and the multiplier and creates a set of partial products from this operations. In accordance to the value of the digital control code, the modified Booth multiplier provides a previous result partial product, a two's complement partial product to complete the negating of the multiplicand, a multiplicand partial product to perform the subtracting according to two's complement arithmetic. The multiplicand is stored in the multiplicand register, the multiplier is stored in the multiplier register, the previous results are stored in the previous results register, and the digital control code in a control register. The n operand adder compiles the partial products into a final result. The final result is stored in a result register and at every increment of the clock is available to the previous results register and to the subsequent external circuitry.

DETAILED DESCRIPTION OF THE INVENTION

Figure 2:
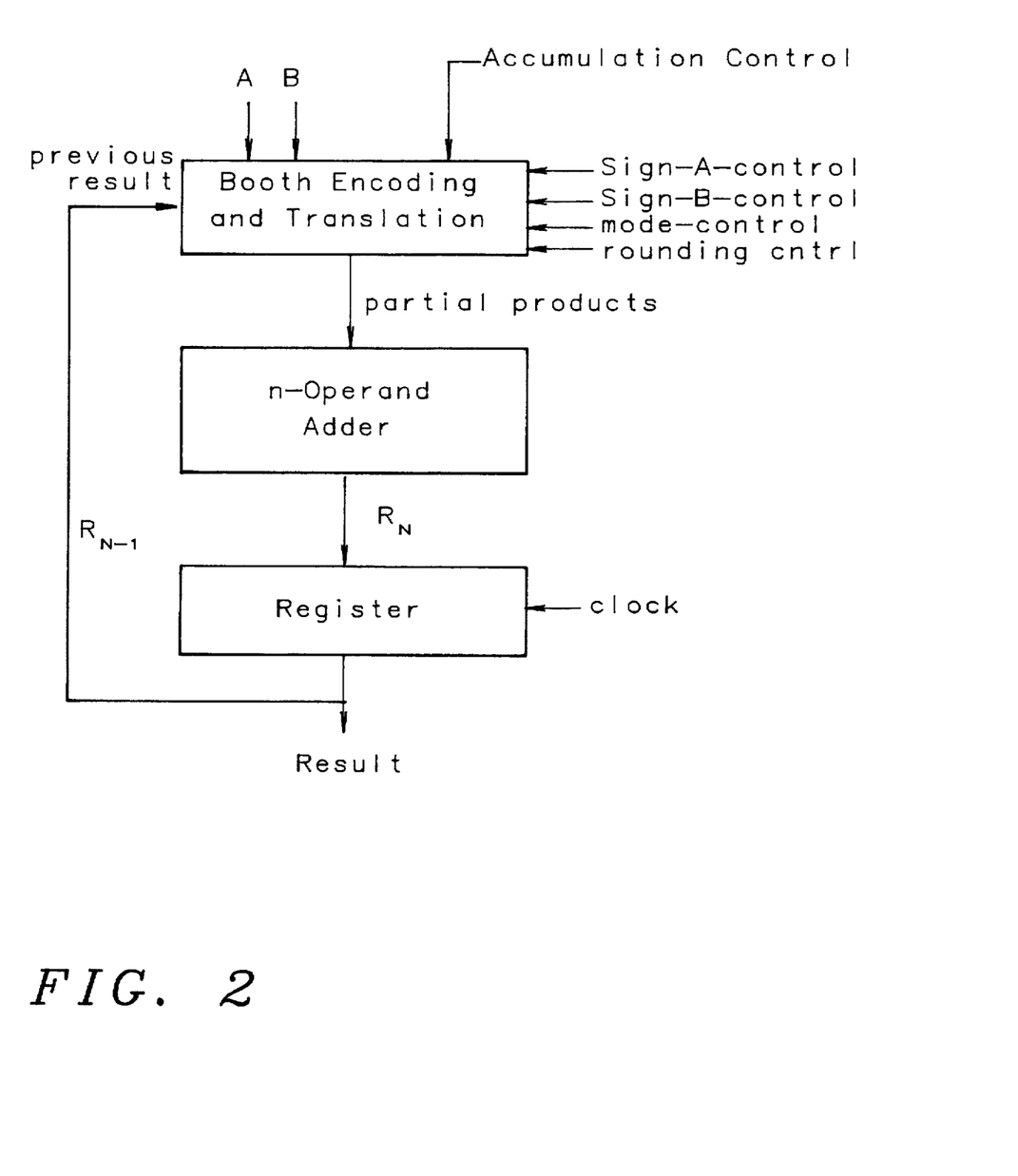
FIG. 2 is a block diagram of the structure of a Multiplier/Accumulator Computation Unit of this invention.

Referring to FIG. 2, the operand A is the multiplicand and the operand B is the multiplier. The multiplicand A and the multiplier B are two's complement binary numbers or unsigned binary numbers that are combined in the Booth encoding and translation unit to form the partial products. The partial products are modified according to the previous result Rn−1 and the control word which includes the Accumulation_Control, sign_B_control, sign_A_control, Mode_Control, and Rounding_Control. The control word will control the shifting of the partial products to the left by on binary digit to multiply the results by a factor of two, the complementing of the operands A and B, the accumulation with the previous results Rn−1, and the multiplication of the result by a factor of two (left shifting of the partial products by one binary digit).

The partial products are summed in the n operand adder to form the result product Rn. The previous result product Rn−1 is transferred to the Booth encoding and translation unit. The output result of the result register is also, passed from the MAC unit to the external circuitry. The output result of the result register changes from the previous result Rn−1 to the current result Rn at the active edge of the clock.

The operations performed by the MAC unit of this invention are:

$R = A \times B$ $R = Rn-1 + A \times B$ $R = Rn-1 - A \times B$ $R = 2X A \times B$ $R = Rn-1 + 2X A \times B$ $R = Rn-1 - 2X A \times B$ and are accomplished in one cycle of the clock.

Figure 3A:
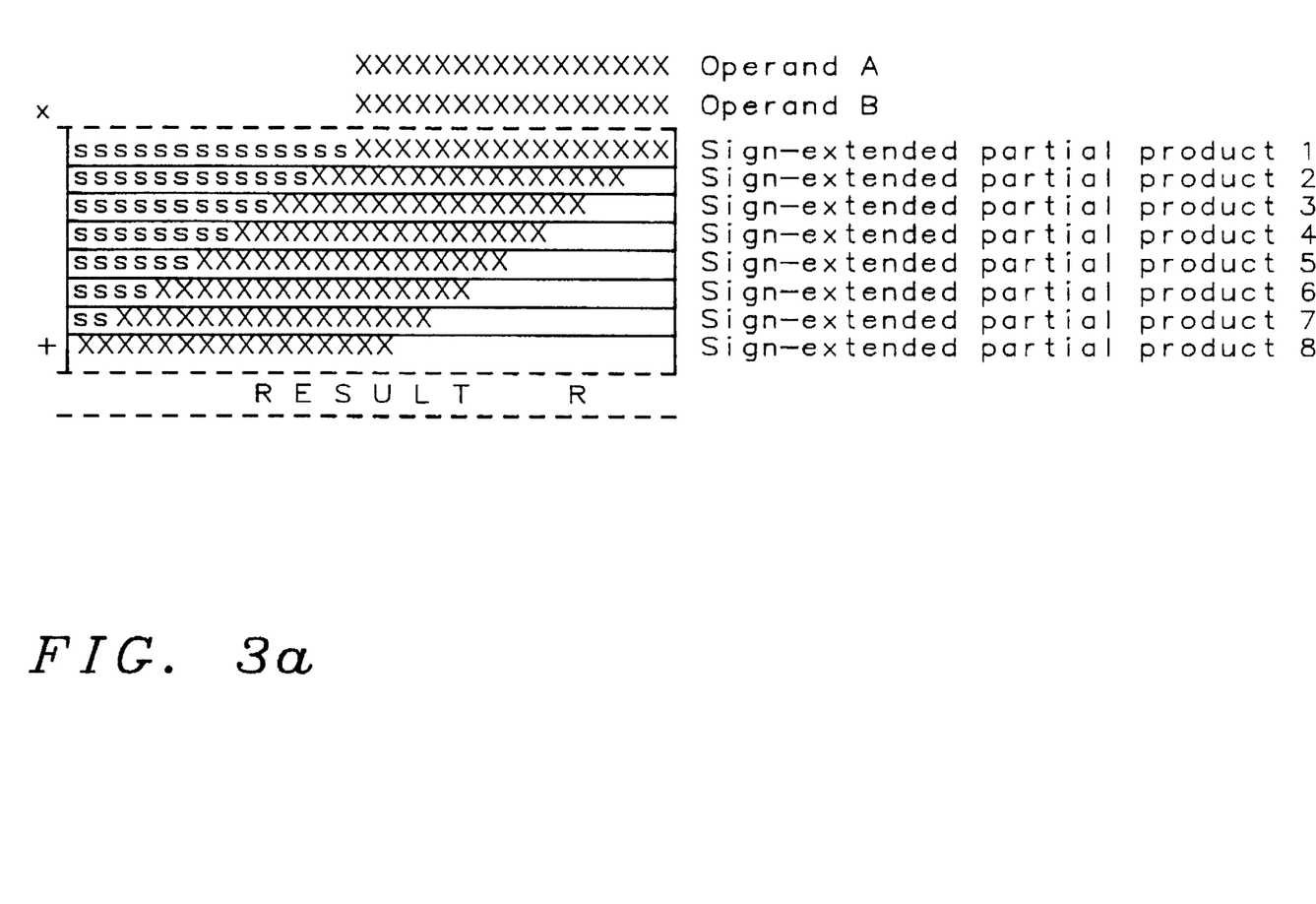
FIGS. 3a–3e are diagrams of the organization of the operands and the partial products during the execution of the method for the performance of the operations of the multiply/accumulate computation unit of this invention.

FIGS. 3a–3e shows how the multiplicand A, multiplier B, and the partial products are structured during the process of performing the aforementioned operations. If the multiplicand A and the multiplier B are both signed operands they will have been formed into two's complement numbers. In FIG. 3a, each digit of the multiplier B will be combined with the multiplicand A to form a partial product (partial products 1–8). According to the Radix 4 Booth's algorithm as described in *Computer Arithmetic Algorithms*, by Isreal Koren, Prentice-Hall Internal Editions, 1993, the number of partial products will be one half the number of bits in the operands B.

As the partial product (partial products 1–8) are formed, they are shifted two digit locations to the left from the previous partial product. This will force the results to have $N_A + N_B$, where $N_A$ is the number of digits in the multiplicand A and $N_B$ is the number of digits in multiplier B.

The result register R will contain extra digits beyond the $N_A + N_B$ number of digits described above to allow for the accumulation of the previous results Rn−1 as the MAC iterates through the process. These extra digits will prevent an overflow fault condition from occurring. In a implementation of the preferred embodiment of this invention, A 16 bit MAC has a results register R that is 40 bits in length. This in excess of the 37 bits required to perform the multiply as described above. The excess binary digits will prevent the aforementioned overflow condition, as the previous results Rn−1 are accumulated with the current results Rn at each iteration.

Each partial product (partial products 1–8) is sign extended s to align with the most significant digit of the result according to the technique described in the Radix 4 Booth's algorithm reference above.

Figure 3B:
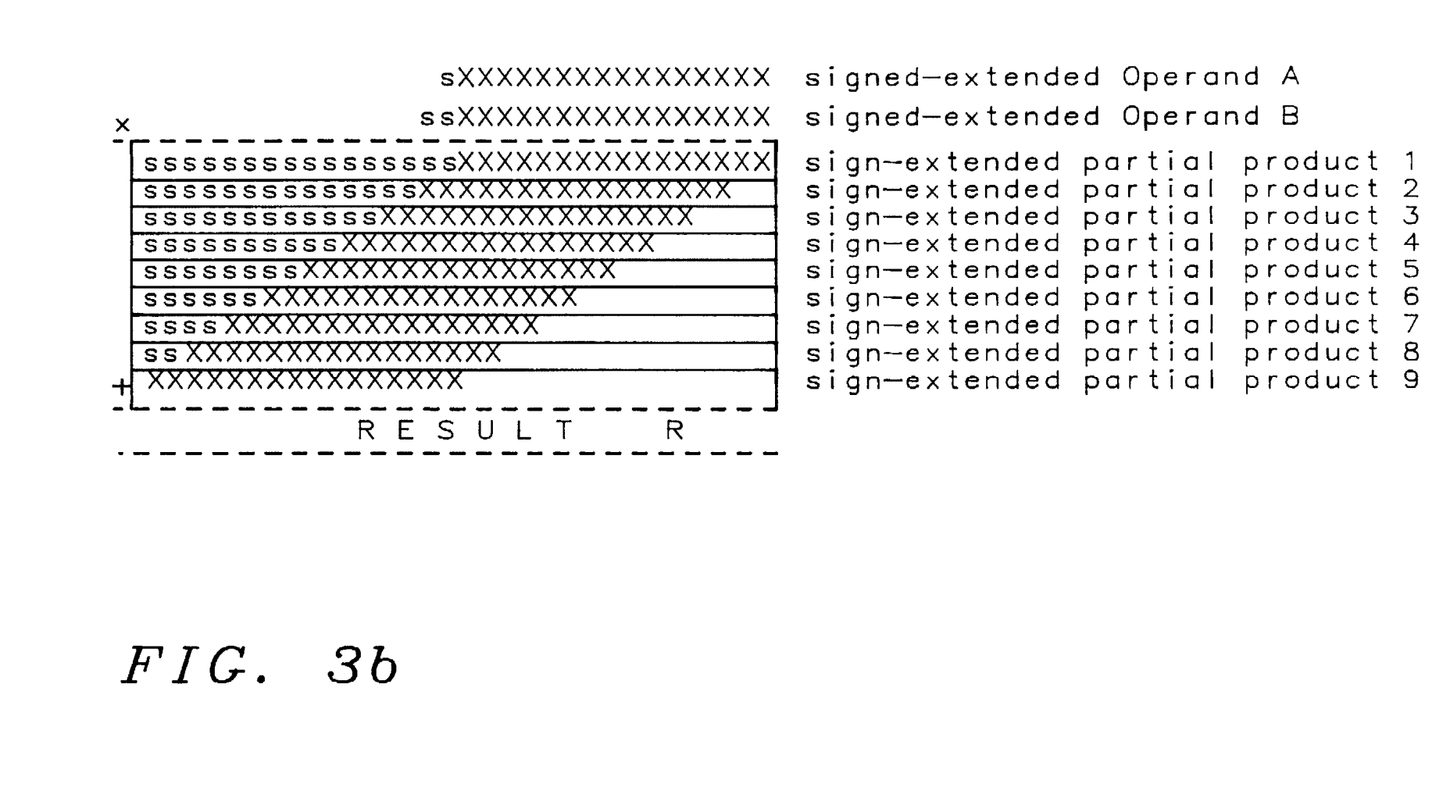

If the operands A and B are unsigned as in FIG. 3b, the multiplicand A has a single bit sign extension s appended to the most significant bit and the two bit sign extension ss is appended to the most significant bits of the multiplier B. This addition of the two sign extension bits will add an additional partial product (partial product 9) to the set of partial products.

The value of the sign bits s are determined by the control signals sign_A_control and sign_B_control. If the operands A and B are unsigned binary numbers, the value of the sign bits s will be 0. However, if the numbers are two's complement binary numbers, then the values of the sign bits s will be as determined in the forming of the two's complement numbers. For example:

*ssssbbbb*
14 = 00001100 unsigned sign extended
+14 = 00001100 two's complement positive number
−14 = 11110100 two's complement negative number According to Booth's algorithm as modified by this invention, each of the partial products (partial products 1–9) will have one of the following values: 0, the multiplicand A, the negative of the multiplicand A, the multiplicand A multiplied by two, or the negative of the multiplicand A multiplied by two.

The two's complement value of the negative of the multiplicand A is not available and has to be developed by complementing the multiplicand A and adding 1 to the value. For instance:

$4 = 1100 = 01100$ (two's complement)

−14 = 10011 (one's complement)
+      1
―――――――――――
−14 = 10100 (two's complement)

or

−11 = 10101 (two's complement)
 11 = 01010 (one's complement)
+      1
―――――――――――
 11 = 01011 (two's complement)

Figure 3C:
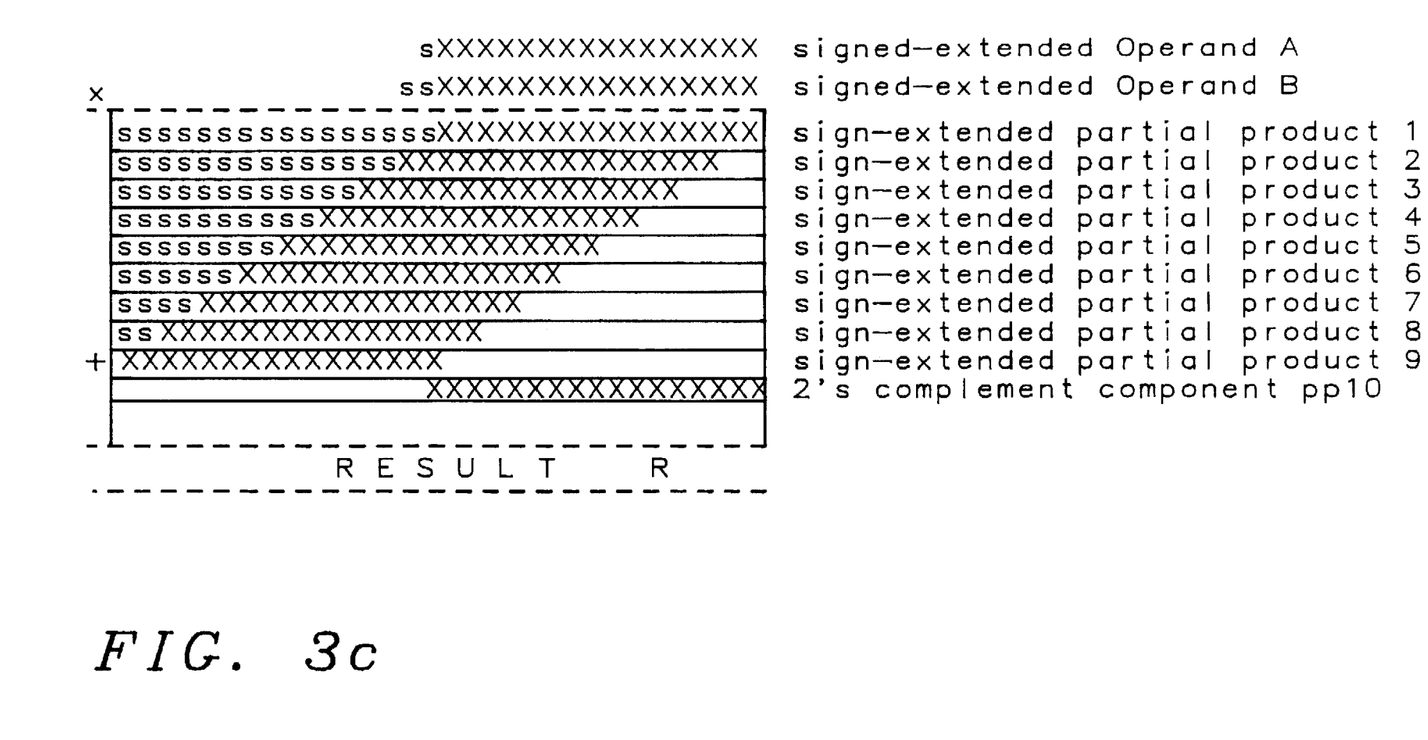

Performing the process directly in the Booth's encoding and translation unit of FIG. 2 requires much time and additional circuitry and can be accomplished with the two's complement partial product component pp10 to the partial products in FIG. 3c. If a partial product (partial product 1–9) is to be a negative of the multiplicand A, then the partial product (partial product 1–9) is complemented and a binary 1 is placed in the bit position of the two's complement partial product pp10 corresponding to the lease significant binary digit of the partial product of interest (partial product 1–9). However, if the partial product (partial product 1–9) is to be −2A, the partial product is shifted one binary digit to the left and a binary 1 is placed at the bit position of the two's complement partial product pp10 aligning with the least significant digit of the left shifted partial product of the partial products product (partial product 1–9).

Figure 3D:
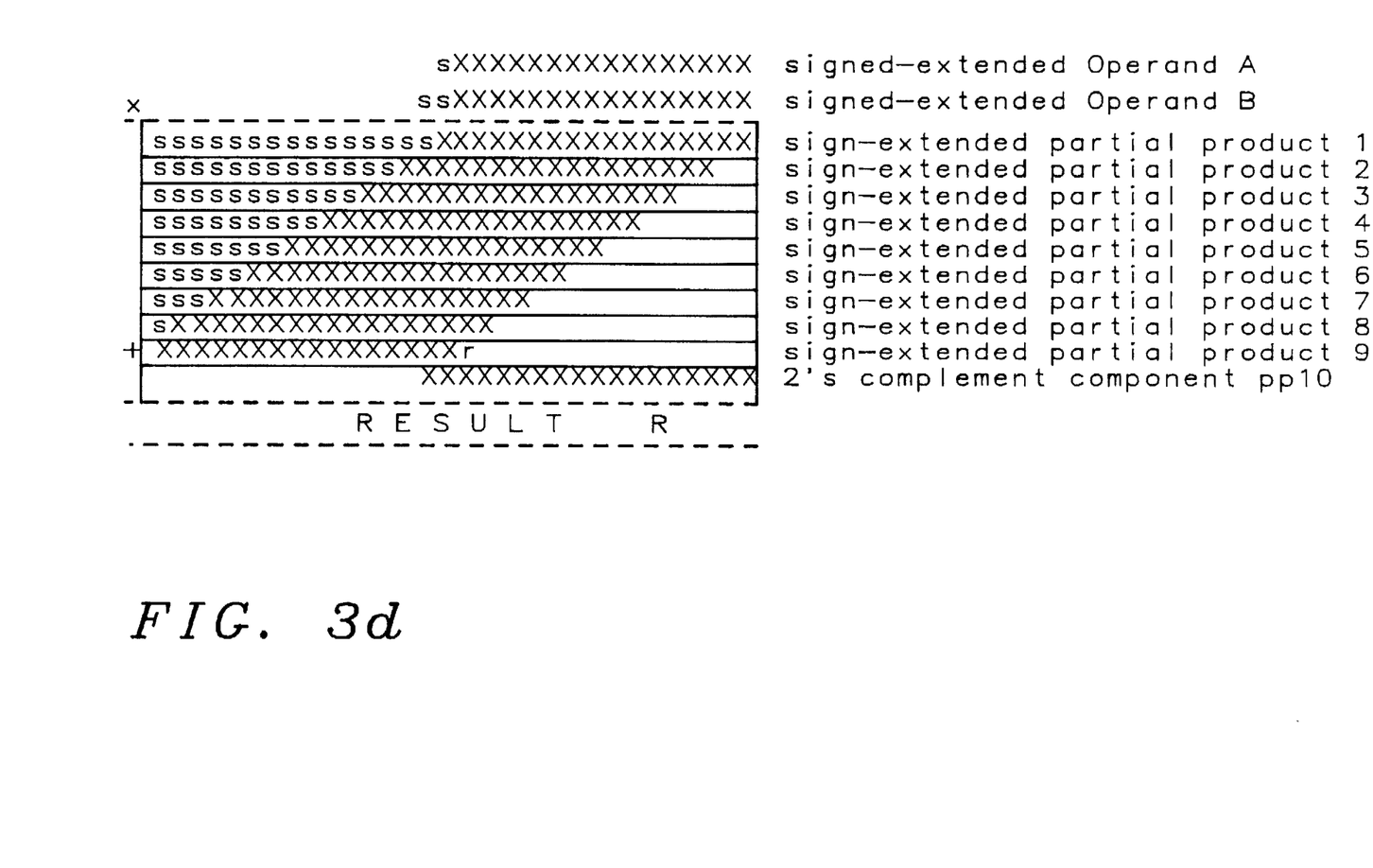

The multiplication of the product of the multiplicand A and the multiplier B by a factor of two can be accomplished by simply shifting all of the above mentioned partial products (partial products 1–10) one binary digit to the left as shown in FIG. 3d.

To perform the rounding of the resulting product a rounding-mode-bit r is appended to the least significant binary digit beyond the desired rounding range. For instance in FIG. 3d, the result is to be rounded to 18 significant binary digits. The rounding-mode-bit r is placed in the partial product 9 and the results from binary digit 15 to the least significant digit position are all made zeroes.

Figure 3E:
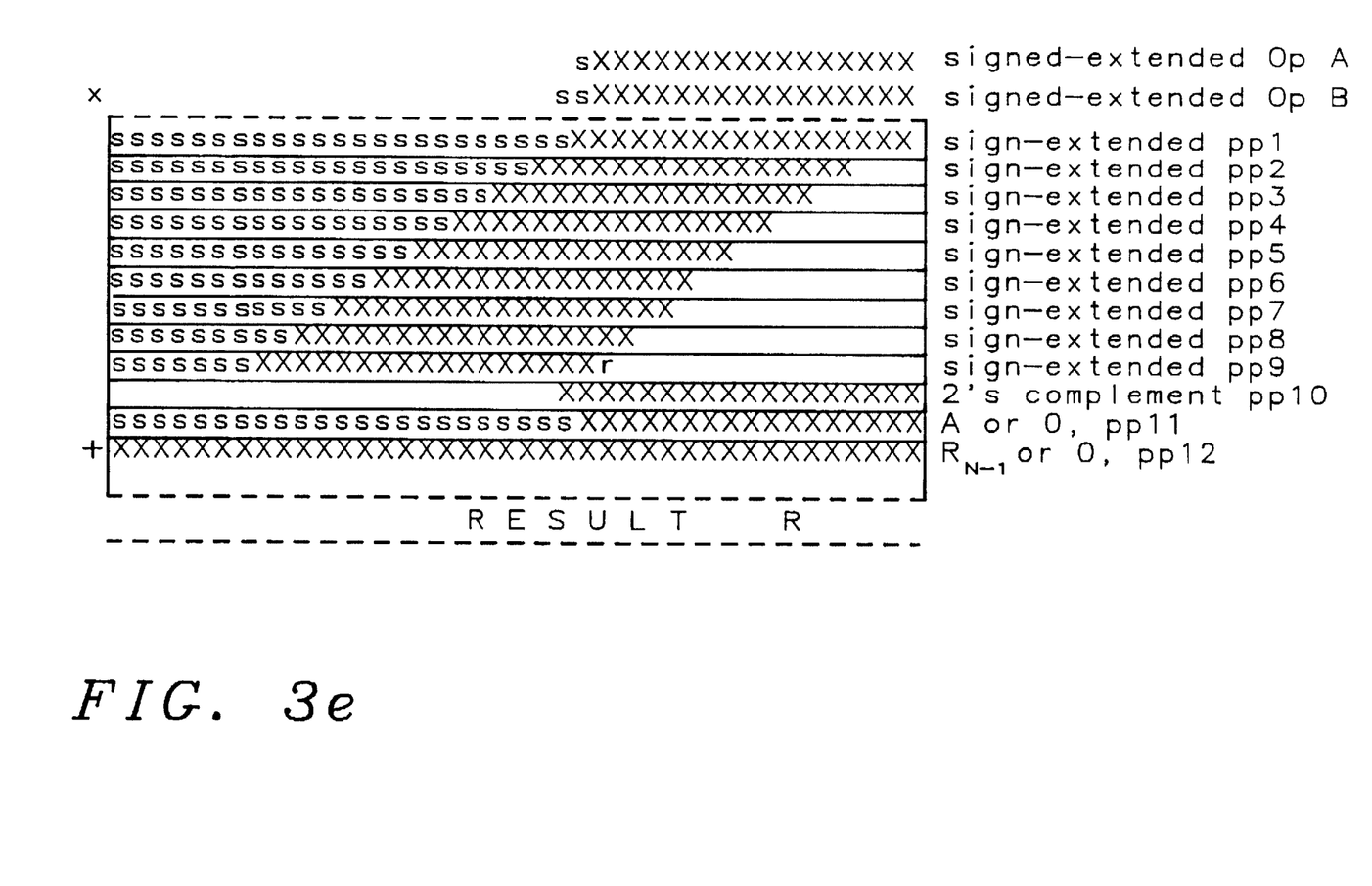

Referring to FIG. 3e, if the operation to be implemented is R=Rn−1+AXB, then a previous result partial product pp12 is appended to the listing of partial products(partial products 1–9 and pp10). However, if the operation is to be R=Rn−1−AXB and the multiplicand A and the multiplier B are both signed numbers, then:

$$Rn-1-AXB = Rn-1+AX(-B)$$
$$Rn-1+AX(-B+1)$$
$$Rn-1+AX-B+A$$

Therefore, the multiplier B is complemented within the Booth encoding and translation unit and a multiplicand partial product pp11 is set to the value of the multiplicand A and is added to the listing of partial products (partial product 1–9, pp10 and pp12). If the multiplier B is not to complemented, then the multiplicand partial product pp11 is set to zeros.

If the multiplicand A is unsigned, the above described process for signed operands is valid. However if the multiplier B is unsigned, it must be sign extended as in FIG. 3b by appending an appropriate binary code to the most significant binary digit of the multiplier B.

Table 1 shows the combination of the operations and signs of the multiplier B to decide how the multiplier B is to be adjusted

TABLE 1

| B SIGNED/ UNSIGNED | OPERATION | ADD/SUBTRACT | MULTIPLIER ADJUSTMENT |
|---|---|---|---|
| signed | R=±AXB | −AXB | s,s,B |
| signed | R=±AXB | +AXB | s,s,B |
| signed | R=$R_{n-1}$±AXB | −AXB | −s,−s,−B |
| signed | R=$R_{n-1}$±AXB | +AXB | s,s,B |
| unsigned | R=±AXB | −AXB | 0,0,B |
| unsigned | R=±AXB | +AXB | 0,0,B |
| unsigned | R=$R_{n-1}$±AXB | −AXB | −0,−0,−B |
| unsigned | R=$R_{n-1}$±AXB | +AXB | 0,0,B |

The adjustments for the multiplier B are controlled by the digital control word shown in FIG. 2 If the operations to performed are $$R=AXB$$
$$R=2XAXB,$$

then the multiplicand partial product pp11 and the previous result partial product pp12 will be set to the value of zero. If the operation is to be:

$$R=Rn-1+AXB$$
$$R=Rn-1+2XAXB,$$

then the multiplicand partial product pp11 has a value of zero, while the previous result partial product pp12 has the previous result.

Figure 4:
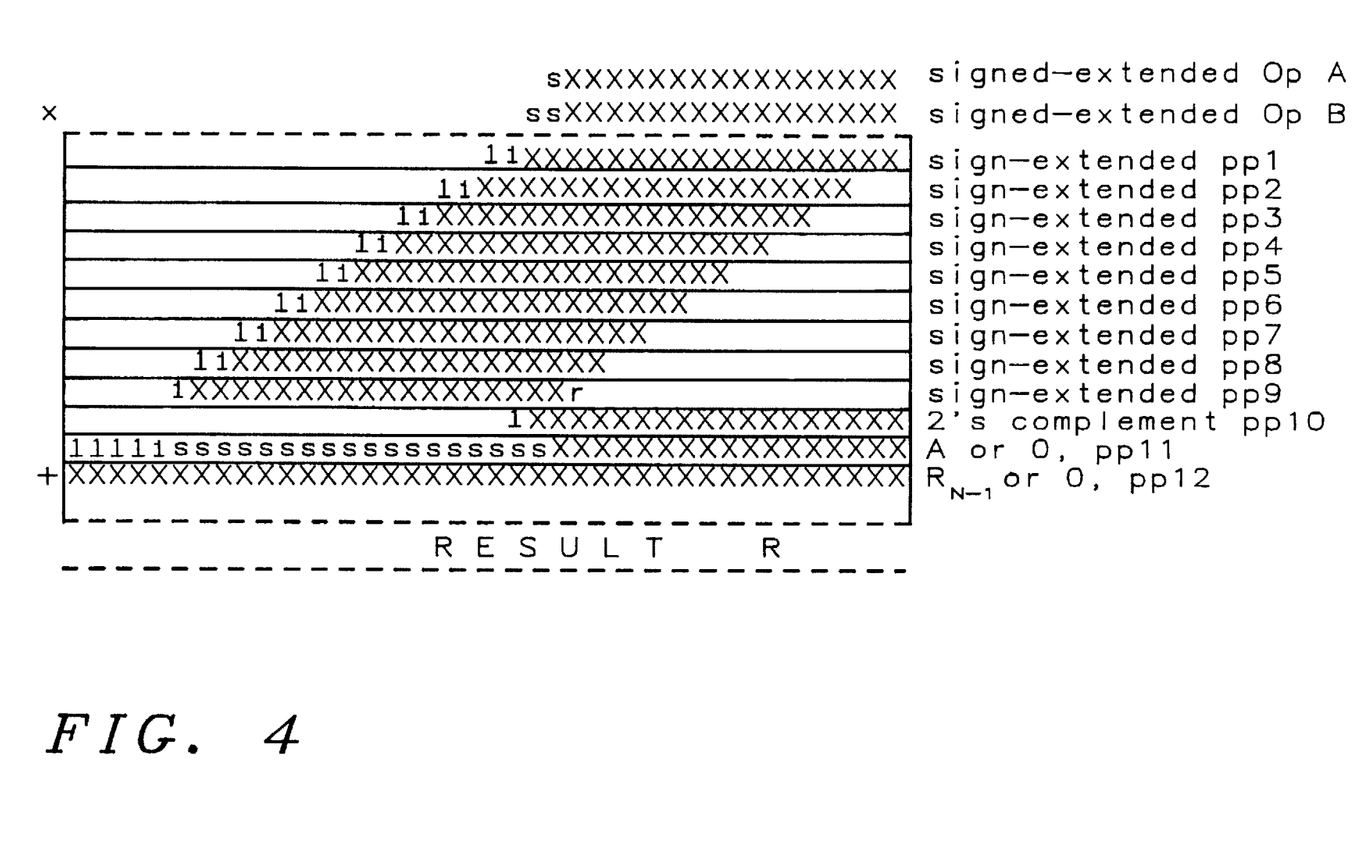
FIG. 4 is diagram of the organization of the operands and the partial products to illustrate the technique to eliminate excessive sign extension bits from the partial products of this invention.

Finally in FIG. 4, the extended sign bits are eliminated from all the partial products according to the technique as described in *Computer Arithmetic Algorithms*, by Isreal Koren, Prentice-Hall Internal Editions, 1993. In this technique the first sign bit i of a partial product is inverted and a 1 is appended to most significant binary digit of the partial products. This process eliminates extra circuitry required for the sign extension.

While this invention has been particularly shown and described with reference to the preferred embodiments thereof, it will be understood by those skilled in the art that various changes in form and details may be made without departing from the spirit and scope of the invention.

What is claimed is:

1. A multiply/accumulate computation circuit to sequentially perform one of the set of operations to form a set of results, wherein said set of operations include multiplying one multiplicand of a plurality of multiplicands and one multiplier of plurality of multipliers to create a product that is one of the set of results, adding said product to one of the set of results from a previous operation to form a second result of the set of results, subtracting of said product from one of the set of results from a previous operation to form a third result of the set of results, multiplying of the product by a factor of two to form a fourth result of the set of results, adding said product that has been multiplied by a factor of two to form a fifth result of the set of results, subtracting said product that has been multiplied by a factor of two to form a sixth result of the set of results, and the rounding of the result of a present operation to form a seventh result of the set of results, comprising:

a) a multiplicand register to contain a first binary number that is one multiplicand of the set of multiplicands;

b) a multiplier register to contain a second binary number that is one multiplier of the set of multipliers;

c) a previous results register that contains a third binary number that is one of the set of results from the previous operation;

d) a control register to contain a digital control code to determine which present operation of the set of operations is to be performed by the multiply/accumulate computation circuit;

e) a modified Booth multiplier coupled to the multiplicand register, the multiplier register, the previous result register, and the control register to produce a plurality of partial products representing the multiplication of the multiplicand and each binary digit of the multiplier, a two's complement partial product to compensate for an inversion of the multiplicand to form a negative value of the multiplicand within the plurality of partial products, a previous result partial product to contain the previous result, and a multiplicand partial product to contain the multiplicand, and perform the subtracting of the product from the previous result according to two's complement arithmetic, as is determined by the digital control code, whereby each partial product of the plurality of partial products has a value of 1 and an inverted sign bit appended after the most significant digit, each two's complement partial product has the value 1 appended after its most significant digit, and the multiplicand partial product has a series of sign extension bits, the inverted sign bit and a series of 1's appended to the most significant digit to minimize a quantity of circuitry;

f) an operand adder means coupled to the multiplicand register and the modified Booth multiplier to sum all the plurality of partial products, the two's complement partial product, the previous result partial product, and the multiplicand partial product to form a result of the set of results; and g) a result register coupled between the n operand adder means and the previous result register and external circuitry, wherein the result of the present operation is stored for use by the previous results register and the external circuitry.

2. The circuit of claim 1 wherein, if the multiplicand and the multiplier are signed binary numbers, the modified Booth multiplier produces the plurality of partial products wherein the number of the plurality of partial products is one half the number of binary digits in the signed binary numbers.

3. The circuit of claim 1 wherein the rounding of the present result is accomplished by the appending of a rounding bit to a final partial product of the plurality of partial products, wherein the value of the rounding bit is determined by the digital control code.

4. The circuit of claim 1 wherein the previous result partial product is a value of zero if the operation is of the set of operations including the multiplying of the multiplicand and the multiplier to form the product and the multiplying of the product by the factor of two; and is the value of the previous result if the operation is of the set of operations including the adding of the previous result to the product, subtracting of the product from the previous result, adding the previous result to the product that has been multiplied by the factor of two and the subtracting of the product that has been multiplied by the factor of two from the previous result.

5. The circuit of claim 1 wherein the multiplicand partial product is a value of zero if the operation is of the set of operations including the multiplying of the multiplicand and the multiplier to form the product, the adding of the previous result to the product, the multiplying of the product by the factor of two, and adding the product that has been multiplied by the factor of two to the previous result; and is the value of the multiplicand if the operation is of the set of operations including subtracting of the product from the previous result, and the subtracting of the product that has been multiplied by the factor of two from the previous result.

6. The circuit of claim 1 wherein the n operand adder may comprises a Wallace tree circuit and a ripple adder.

7. The circuit of claim 1 wherein, if the multiplicand and the multiplier are unsigned binary numbers, the multiplicand is sign extended by the addition of a sign bit to a most significant binary digit of the multiplicand and the multiplier is sign extended by the addition of two sign bits to the most significant binary digit of the multiplier.

8. The circuit of claim 7 wherein the modified Booth multiplier produces the plurality of partial products wherein the number of the plurality of partial products is one half the number of digits in the unsigned number plus one.

9. The circuit of claim 1 wherein the set of partial products will be one of a set of partial product types, that includes zero, a first binary number that is the multiplicand, a second binary number that is multiplicand multiplied by two, a third binary number that is a negative value of the multiplicand, a fourth binary number that is the multiplicand multiplied by a negative two.

10. The circuit of claim 9 wherein the negative value of the multiplicand is provided by an inversion of the binary digits of the multiplicand and the placing of a one in the two's complement partial product in a digit that corresponds to a least significant bit of said negative value of the multiplicand.

11. A method for the performance of a set of multiply/accumulate computation operations to form a set of results that include multiplying one multiplicand of a plurality of multiplicands and one multiplier of plurality of multipliers to create a product that is one of the set of results, adding said product to one of the set of results from a previous operation to form a second result of the set of results, subtracting of said product from one of the set of results from a previous operation to form a third result of the set of results, multiplying of the product by a factor of two to form a fourth result of the set of results, adding said product that has been multiplied by a factor of two to form a fifth result of the set of results, subtracting said product that has been multiplied by a factor of two to form a sixth result of the set of results, and the rounding of the result of a present operation to form a seventh result of the set of results, comprising the steps of:

a) placing in a multiplicand register a first binary number that is one multiplicand of the set of multiplicands;

b) placing in a multiplier register a second binary number that is one multiplier of the set of multipliers;

c) placing in a previous results register a third binary number that is the one of the set of results from the previous operation;

d) placing in a control register a digital control code to determine which present operation of the set of multiply/accumulate computation operations is to be performed;

e) multiplying in a modified Booth multiplier according to a modified Radix 4 Booth's algorithm the contents of the multiplicand register, the multiplier register, the previous result register, and the control register to produce a plurality of partial products representing the multiplication of the multiplicand and each binary digit of the multiplier, a two's complement partial product to compensate for an inversion of the multiplicand to form a negative value of the multiplicand within the plurality of partial products, a previous result partial product to contain the previous result, and a multiplicand partial product to contain the multiplicand to perform the subtracting of the product from the previous result according to two's complement arithmetic, as is determined by the digital control code, whereby each partial product of the plurality of partial products has a value of 1 and an inverted sign bit appended after the most significant digit, each two's complement partial product has the value 1 appended after its most significant digit, and the multiplicand partial product has a series of sign extension bits, the inverted sign bit and a series of 1's appended to the most significant digit;

f) summing of all the plurality of partial products, the two's complement partial product, the previous result partial product, and the multiplicand partial product in a n operand adder means coupled to the multiplicand register and the Modified Booth multiplier to form a result of the set of results; and g) placing of the result in a result register coupled between the n operand adder means and the previous result register and external circuitry, where in the result of the present operation is stored for use by the previous results register and the external circuitry.

12. The method of claim 11 wherein if the multiplicand and the multiplier are signed binary numbers, the Modified Booth multiplier produces the plurality of partial products wherein the number of the plurality is one half the number of binary digits in the signed binary numbers.

13. The method of claim 11 wherein the rounding of the present result is accomplished by the appending of a rounding bit to a final partial product of the plurality of partial products; wherein the value of the rounding bit is determined by the digital control code.

14. The method of claim 11 wherein the previous result partial product is a value of zero if the operation is of the set of operations including the multiplying of the multiplicand and the multiplier to form the product and the multiplying of the product by the factor of two; and is the value of the previous result if the operation is of the set of operations including the adding of the previous result to the product, subtracting of the product from the previous result, adding the previous result to the product that has been multiplied by the factor of two and the subtracting of the product that has been multiplied by the factor of two from the previous result.

15. The method of claim 11 wherein the multiplicand partial product is a value of zero if the operation is of the set of operations including the multiplying of the multiplicand and the multiplier to form the product, the adding of the previous result to the product, the multiplying of the product by the factor of two, and adding the product that has been multiplied by the factor of two to the previous result; and is the value of the multiplicand if the operation is of the set of operations including subtracting of the product from the previous result, and the subtracting of the product that has been multiplied by the factor of two from the previous result.

16. The circuit of claim 11 wherein the n operand adder may comprises a Wallace tree circuit and a ripple adder.

17. The method of claim 11 wherein if the multiplicand and the multiplier are unsigned binary numbers, the multiplicand is sign extended by the addition of a sign bit to a most significant binary digit of the multiplicand and the multiplier is sign extended by the addition of two sign bits to the most significant binary digit of the multiplier.

18. The method of claim 17 wherein the modified Booth multiplier produces the plurality of partial products wherein the number of the plurality of partial products is one half the number of digits in the unsigned number plus one.

19. The method of claim 11 wherein the set of partial products will be one of a set of partial product types, that includes zero, a first binary number that is the multiplicand, a second binary number that is multiplicand multiplied by two, a third binary number that is a negative value of the multiplicand, a fourth binary number that is the multiplicand multiplied by a negative two.

20. The method of claim 19 wherein the negative value of the multiplicand is provided by an inversion of the binary digits of the multiplicand and the placing of a one in the two's complement partial product in a digit that corresponds to a least significant bit of said negative value of the multiplicand.

* * * * *